US011198321B2

United States Patent
Koshido et al.

(10) Patent No.: US 11,198,321 B2
(45) Date of Patent: Dec. 14, 2021

(54) WHEEL, DRIVE WHEEL AND WHEELCHAIR

(71) Applicant: Honda Motor Co., Ltd., Tokyo (JP)

(72) Inventors: Akihiko Koshido, Saitama (JP); Kazuma Yoshii, Saitama (JP); Wakato Yamamoto, Saitama (JP); Junji Takado, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 335 days.

(21) Appl. No.: 16/412,394

(22) Filed: May 14, 2019

(65) Prior Publication Data

US 2019/0389246 A1    Dec. 26, 2019

(30) Foreign Application Priority Data

Jun. 20, 2018 (JP) .............................. JP2018-116951

(51) Int. Cl.
*B60B 3/12* (2006.01)
*B62M 1/14* (2006.01)
*B60B 7/00* (2006.01)

(52) U.S. Cl.
CPC .............. *B60B 3/12* (2013.01); *B60B 7/0006* (2013.01); *B60B 7/0046* (2013.01); *B62M 1/14* (2013.01)

(58) Field of Classification Search
CPC ........... B60B 3/12; B60B 3/00; B60B 7/0006; B60B 7/0046; B62M 1/14
See application file for complete search history.

(56) References Cited

U.S. PATENT DOCUMENTS

| 8,491,063 | B2 * | 7/2013 | Stich ....................... B60B 3/044 |
| | | | 301/64.306 |
| 2015/0049398 | A1 * | 2/2015 | Lewicki .................. B60B 1/003 |
| | | | 359/842 |
| 2015/0367676 | A1 * | 12/2015 | Hendel ..................... B60B 3/02 |
| | | | 301/63.107 |

FOREIGN PATENT DOCUMENTS

| GB | 2525931 A | * 11/2015 | ............... B60B 3/12 |
| JP | S61169701 | 10/1986 | |
| JP | H03240524 | 10/1991 | |
| JP | 2014180934 | 9/2014 | |
| JP | 2017158623 | 9/2017 | |

OTHER PUBLICATIONS

"Office Action of Japan Counterpart Application," with English translation thereof, dated Oct. 29, 2019, p. 1-p. 6.

* cited by examiner

*Primary Examiner* — Jason R Bellinger
(74) *Attorney, Agent, or Firm* — JCIPRNET

(57) ABSTRACT

The disclosure provides a wheel, drive wheel and wheelchair. The wheel includes an annular rim and a disk covering the rim on one side in an axial direction of the rim. The disk of the wheel includes a skin and a cushion member. The skin is formed of a fiber-reinforced material. The cushion member includes a cushion part and a shape retaining part. The cushion part is formed of a shock absorbing material and is disposed adjacent to the skin. The shape retaining part is formed of a fiber-reinforced material and is disposed adjacent to the cushion part.

18 Claims, 6 Drawing Sheets

WHEEL, DRIVE WHEEL AND WHEELCHAIR

CROSS-REFERENCE TO RELATED APPLICATION

This application claims the priority of Japan patent application serial no. 2018-116951, filed on Jun. 20, 2018. The entirety of the above-mentioned patent application is hereby incorporated by reference herein and made a part of this specification.

BACKGROUND

Technical Field

The disclosure relates to a wheel and in particular relates to a wheel of a drive wheel of a racing wheelchair used for track racing, marathon, etc.

Description of Related Art

There is a conventional wheel used in wheelchairs, bicycles, etc., which includes an annular rim and a disk. A tire is fitted onto the rim. The disk covers the rim on one side in the axial direction of the rim (for example, see Patent Document 1).

RELATED ART

Patent Document

[Patent Document 1] Japanese Laid-open No. 2014-180934

However, when the wheel as described in Patent Document 1 is used in a racing wheelchair, a hand rim is attached to the disk of the wheel, which constitutes the drive wheel of the wheelchair, for the user to transmit the driving force. Therefore, when the occupant grips the hand rim, the occupant's hands may collide with the surface of the disk. Then, the disk may be damaged by the shock applied at the time of the collision.

SUMMARY

A wheel according to the disclosure includes an annular rim onto which a tire is fitted; and a disk covering the rim on one side in an axial direction of the rim. The disk includes a skin member and a cushion member in order from the one side in the axial direction, wherein the skin member is formed of a fiber-reinforced material and forms a skin of the disk, and the cushion member is disposed adjacent to the skin member. The cushion member includes a cushion part and a shape retaining part in order from the one side in the axial direction, wherein the cushion part is formed of a shock absorbing material and is disposed adjacent to the skin member, and the shape retaining part is formed of a fiber-reinforced material and is disposed adjacent to the cushion part.

Thus, the wheel of the disclosure includes the cushion member that is disposed on the other side of the disk in the axial direction with respect to the skin member. The cushion member is formed by the cushion part disposed adjacent to the skin member and the shape retaining part disposed adjacent to the cushion part.

In addition, the wheel of the disclosure includes a plate-shaped member which is disposed on the other side in the axial direction with respect to the disk and on an inner side of the rim and is formed of a shock absorbing material.

Moreover, when the wheel of the disclosure includes the plate-shaped member, the plate-shaped member includes a plurality of plate-shaped parts and a connection part, wherein the plate-shaped parts are formed of a shock absorbing material, and the connection part is formed of a fiber-reinforced material and connects the plate-shaped parts. The cushion part of the cushion member is formed of one plate-shaped shock absorbing member.

Further, in the wheel of the disclosure, the disk includes an attaching part to which a hand rim of a wheelchair is attached on the one side in the axial direction.

A drive wheel according to the disclosure includes the wheel according to any one of the above; and a tire fitted onto the wheel.

A wheelchair according to the disclosure includes the above drive wheel.

BRIEF DESCRIPTION OF THE DRAWINGS

FIG. 5A to FIG. 5C are explanatory views showing the configuration of a plate-shaped part of the wheel of FIG. 4, wherein FIG. 5A shows the plate-shaped part, FIG. 5B shows a long beam, and FIG. 5C shows a state where the long beam and a short beam are attached to the plate-shaped part.

DESCRIPTION OF THE EMBODIMENTS

The disclosure provides a wheel, a drive wheel, and a wheelchair which are less likely to be damaged.

As a result, when shock is applied to the skin member of the disk, the shock is received by the cushion part adjacent to the skin member. At this time, if the cushion part is bent largely by the shock, the skin member is also bent together with the cushion part, and the skin member may be damaged. For example, the skin member may have cracks. However, in the case of the wheel, the bend of the cushion part is suppressed by the shape retaining part disposed on the side of the cushion part opposite to the skin member.

According to the wheel of the disclosure, when shock is applied to the skin member of the disk, the influence of the shock is alleviated by the cushion member. Therefore, the skin member (eventually the disk itself) is less likely to be damaged.

When such a plate-shaped member is disposed, the shock is also absorbed by the plate-shaped member, so further damage can be prevented.

Compared with the cushion member, the plate-shaped member plays a small role in absorbing shock. However, the plate-shaped member also plays a role of increasing the rigidity in the radial direction of the wheel. Thus, when the cushion part of the cushion member is formed by one plate-shaped cushion member, which easily absorbs shock, and the plate-shaped member includes the connection part with high rigidity as described above, it is possible not only to improve the strength against shock of striking (that is, shock in the radial direction and the circumferential direction) to prevent damage but also to improve the rigidity in the radial direction to suppress distortion or the like of the wheel.

The disk of the wheel of the disclosure can prevent damage caused by various shocks. However, the wheel is particularly effective in preventing damage caused by shock of striking, and if the disk is disposed on the side to which the hand rim of the wheelchair is attached (that is, the side where the hand of the occupant of the wheelchair is very likely to collide), the effect of preventing the damage can be used effectively.

Hereinafter, the configuration of a wheelchair W according to an embodiment will be described with reference to the drawings. The wheelchair W is used for track racing, marathon, etc.

First, a schematic configuration of the wheelchair W will be described with reference to FIG. 1 to FIG. 3.

Figure 1:
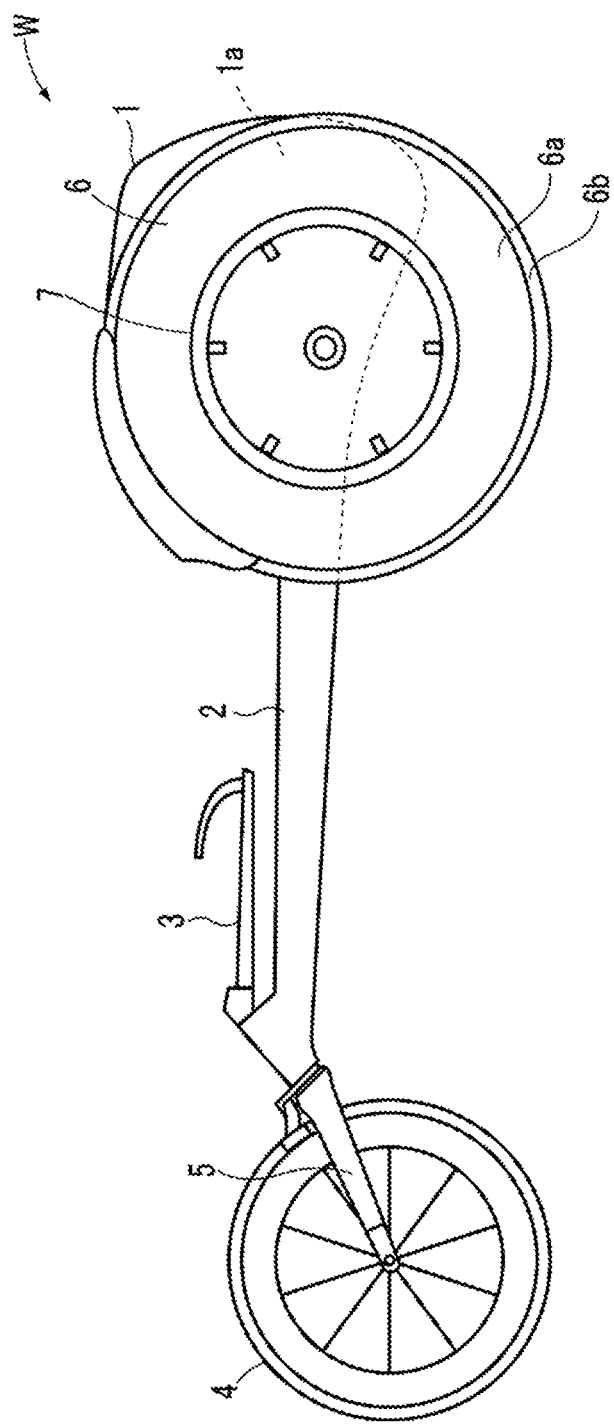
FIG. 1 is a side view of a wheelchair according to an embodiment of the disclosure.

As shown in FIG. 1, the wheelchair W includes a cage 1, a vehicle body frame 2 extending in front of the cage 1, a steering handle 3 provided on the vehicle body frame 2, a front wheel 4 disposed at the front end portion of the vehicle body frame 2, a front fork 5 attached to the front end portion of the vehicle body frame 2 and connected with the handle 3 to hold the front wheel 4, a pair of rear wheels 6 (drive wheels) attached to the left and right of the cage 1, and a hand rim 7 attached to a side of each rear wheel 6 opposite to the cage 1.

Figure 2:
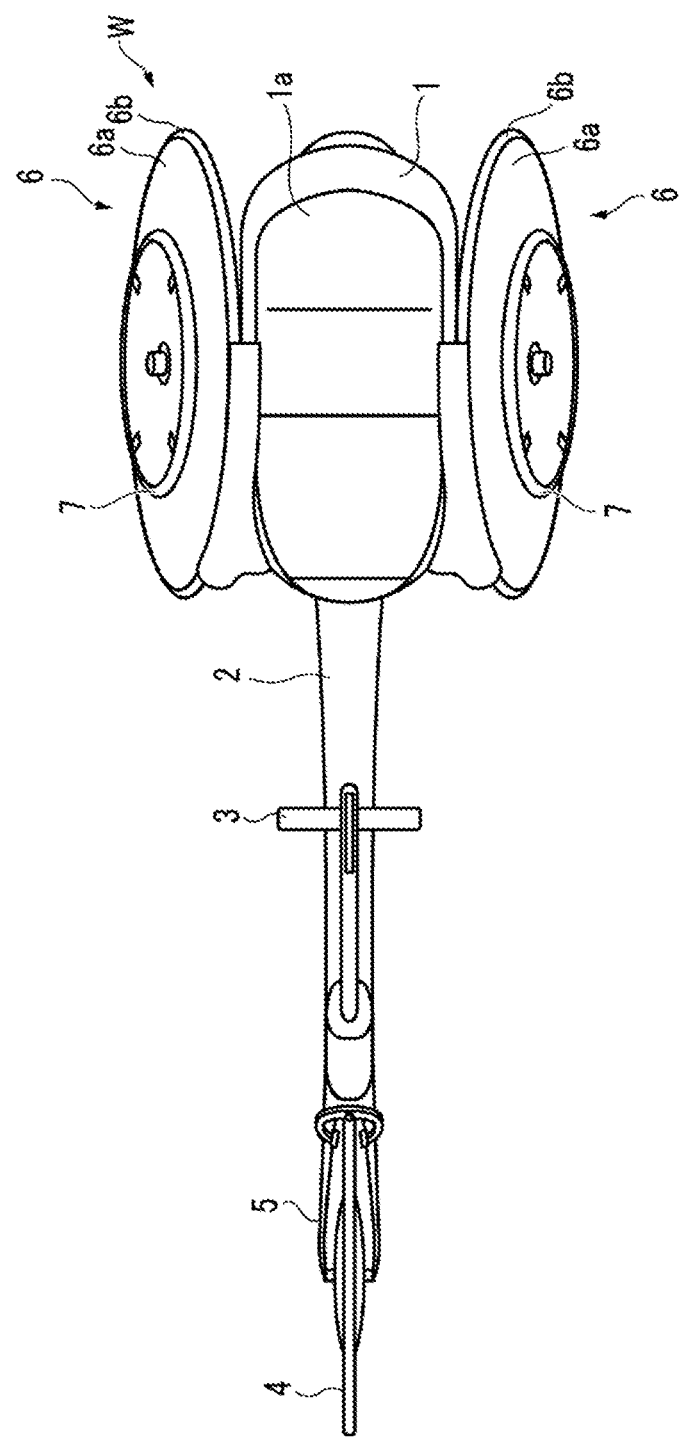
FIG. 2 is a plan view of the wheelchair of FIG. 1.

As shown in FIG. 2, the upper portion of the cage 1 is open, and a seat 1a where an athlete (occupant) is seated is disposed inside the cage 1.

The handle 3 is connected to an end portion of a column part 5a (see FIG. 3) of the front fork 5 pivotally supported by a tip portion of the vehicle body frame 2. By operating the handle 3 of the wheelchair W, the direction of the front wheel 4 can be changed via the front fork 5 to turn the wheelchair W in a desired direction.

The rear wheel 6 includes a wheel 6a and a tire 6b fitted onto the wheel 6a. The rear wheel 6 is obliquely attached to the cage 1 such that the upper side of the rear wheel 6 is closer to the center side of the cage 1.

The hand rim 7 is fixed to be rotatable integrally with the rear wheel 6. The athlete seated on the seat 1a transmits a driving force to the rear wheel 6 via the hand rim 7.

Figure 3:
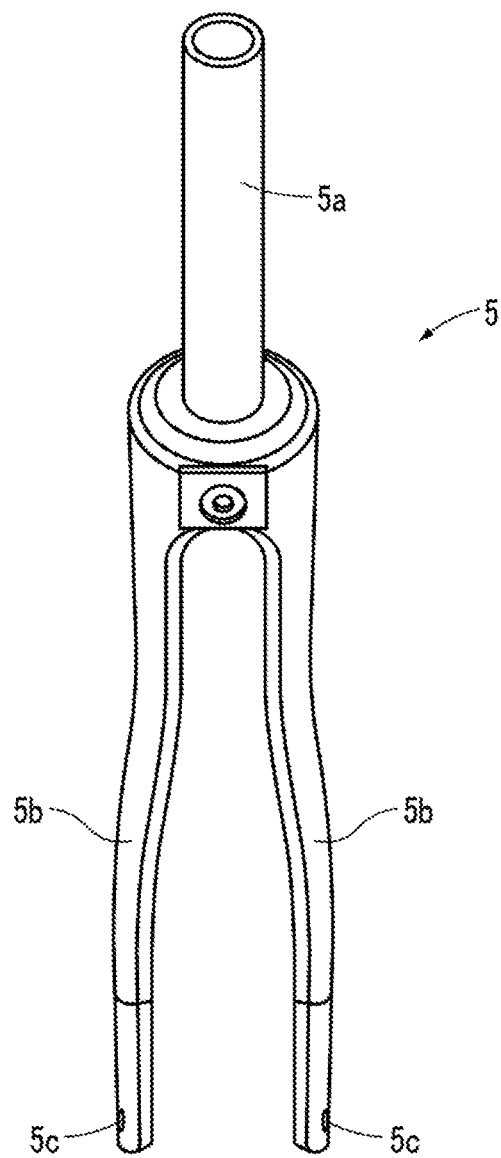
FIG. 3 is a perspective view as seen from the front side of a front fork of the wheelchair of FIG. 1.

As shown in FIG. 3, the front fork 5 has the column part 5a and a fork part 5b. The column part 5a is supported by the tip portion of the vehicle body frame 2. The fork part 5b extends forward and bifurcates from the column part 5a. A bearing hole 5c for supporting the axle of the front wheel 4 is formed in the tip portion of the fork part 5b.

The column part 5a is formed in a cylindrical shape and is pivotally supported at the front end portion of the vehicle body frame 2 via a bearing (not shown). The handle 3 (see FIG. 1) is fixed to the upper end portion of the column part 5a.

Next, the wheel 6a of the rear wheel 6 of the wheelchair W will be described with reference to FIG. 4 to FIG. 6.

Figure 4:
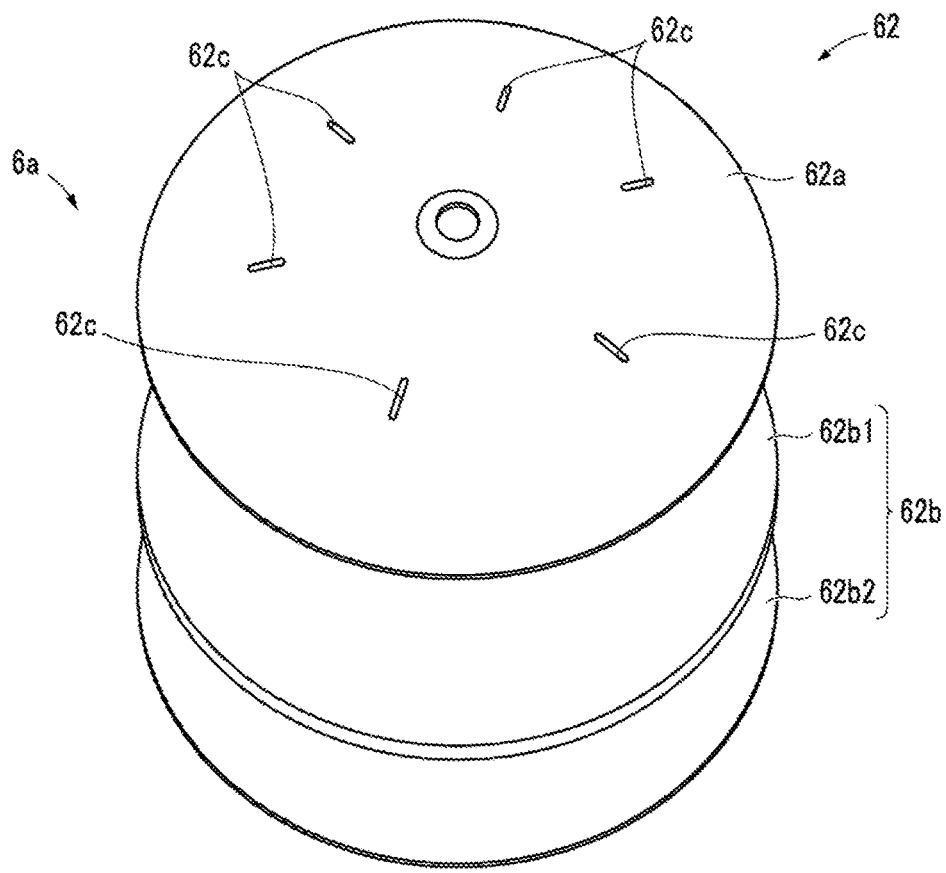
FIG. 4 is an exploded perspective view of a wheel of the wheelchair of FIG. 1.
Figure 4:
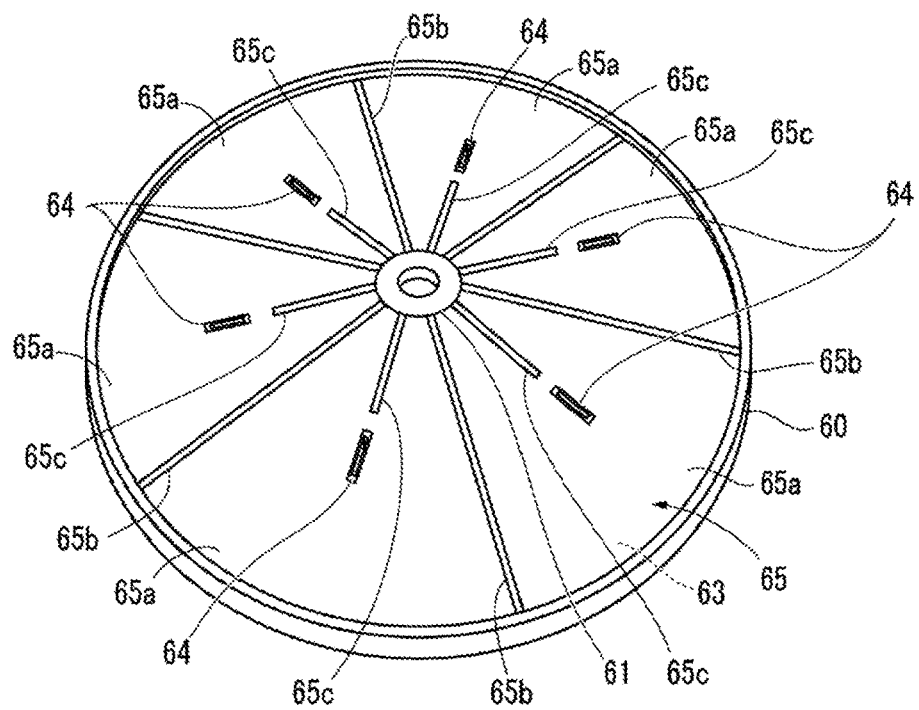

As shown in FIG. 4, the wheel 6a includes an annular rim 60, a hub 61, a disk 62, a cover 63, fixing members 64, and a plate-shaped member 65. The tire 6b (see FIG. 2) is fitted onto the rim 60. The hub 61 is disposed in the center portion of the rim 60, and an axle extending from the cage 1 is combined with the hub 61. The disk 62 covers the space between the rim 60 and the hub 61 on the side opposite to the cage 1 (one side in the axial direction of the rim 60). The cover 63 covers the space between the rim 60 and the hub 61 on the side of the cage 1 (the other side in the axial direction of the rim). The fixing members 64 are disposed at equal intervals in the circumferential direction between the disk 62 and the cover 63. The plate-shaped member 65 is disposed to be sandwiched between the disk 62 and the cover 63 on the inner side of the rim 60.

The hand rim 7 is fixed to the fixing members 64 on one side of the disk 62 via a screw (not shown) that penetrates the hand rim 7 and the disk 62. That is, the fixing members 64 and the screw form an attaching part for attaching the hand rim 7.

The plate-shaped member 65 includes six fan-shaped plate-shaped parts 65a, long beams 65b (connection parts) disposed between adjacent plate-shaped parts 65a, and short beams 65c attached to be radially outward from the center side of the plate-shaped parts 65a. The plate-shaped parts 65a are formed of a shock absorbing material such as a hard foam material, a synthetic resin, wood, or the like. The long beams 65b and the short beams 65c are formed of a fiber-reinforced material such as fiber-reinforced plastic, or the like.

The fiber-reinforced material constituting the long beams 65b and the short beams 65c includes, for example, fiber-reinforced plastic using polyacrylonitrile (PAN)-based carbon fiber, aramid fiber-reinforced plastic, glass fiber, pitch-based carbon fiber, PBO fiber, polyarylate fiber, polyethylene fiber, or the like.

Figure 5A:
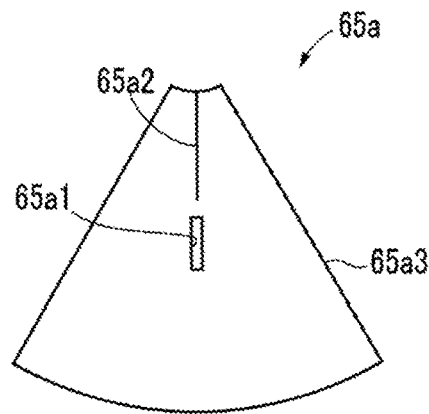

As shown in FIG. 5A, the plate-shaped part 65a is a fan-shaped member. The tip portion of the plate-shaped part 65a on the center side of the hub 61 is cut into a shape corresponding to the peripheral surface of the hub 61 (see FIG. 4). The plate-shaped part 65a has a thickness that allows it to be fitted into a recess formed on the peripheral surface of the hub 61. A through hole 65a1 is formed substantially at the center of the plate-shaped part 65a. The fixing member 64 (see FIG. 4) is fitted into the through hole 65a1. A notch 65a2 is formed to be radially outward from the tip of the plate-shaped part 65a on the center side.

Figure 5B:
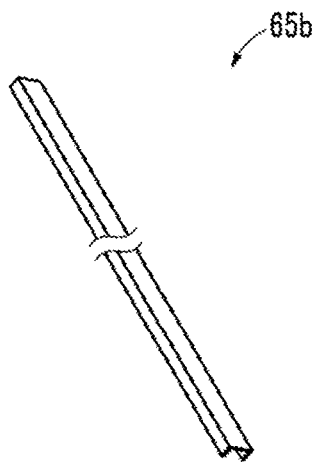
Figure 5C:
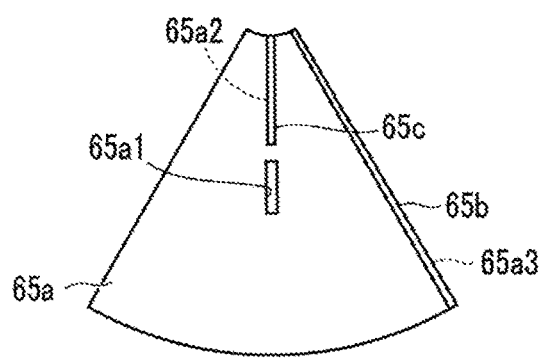

As shown in FIG. 5B, the long beam 65b is an elongated beam that has a U shape in the cross-sectional view. The long beam 65b has a length corresponding to the length of a side edge 65a3 (see FIG. 5A) of the plate-shaped part 65a. The width of the cross-sectional shape of the long beam 65b corresponds to the thickness of the side edge 65a3 of the plate-shaped part 65a. Therefore, as shown in FIG. 5C, the long beam 65b is fitted to the side edge 65a3 of the plate-shaped part 65a to be fixed to the plate-shaped part 65a.

Similar to the long beam 65b, the short beam 65c is an elongated beam that has a U shape in the cross-sectional view. The short beam 65c has a length corresponding to the length of the notch 65a2 of the plate-shaped part 65a. The width of the cross-sectional shape of the short beam 65c corresponds to the thickness of the notch 65a2 of the plate-shaped part 65a. Therefore, the short beam 65c is inserted into the notch 65a2 of the plate-shaped part 65a to be fixed to the plate-shaped part 65a.

The plate-shaped member 65 is formed by connecting the plate-shaped part 65a with the long beam 65b and the short beam 65c attached thereto (that is, the member shown in FIG. 5C) to each other by using an adhesive or by applying a heat treatment while the six plate-shaped parts 65a are arranged side by side around the hub 61.

Reverting to FIG. 4, the disk 62 is disposed on one side (the upper side in FIG. 4) of the plate-shaped member 65, which is disposed on the inner side of the rim 60, in the axial direction of the rim 60.

The disk 62 includes a skin 62a (skin member) and a cushion member 62b in order from one side in the axial direction of the rim 60. The skin 62a forms the skin of the disk. The cushion member 62b is disposed adjacent to the skin 62a. The thickness of the disk 62 is set to be 25% or less of the thickness of the plate-shaped member 65. In addition, insertion holes 62c, through which screws for fixing the hand rim 7 are inserted, are formed on the disk 62 at positions corresponding to the fixing members 64.

Figure 6:
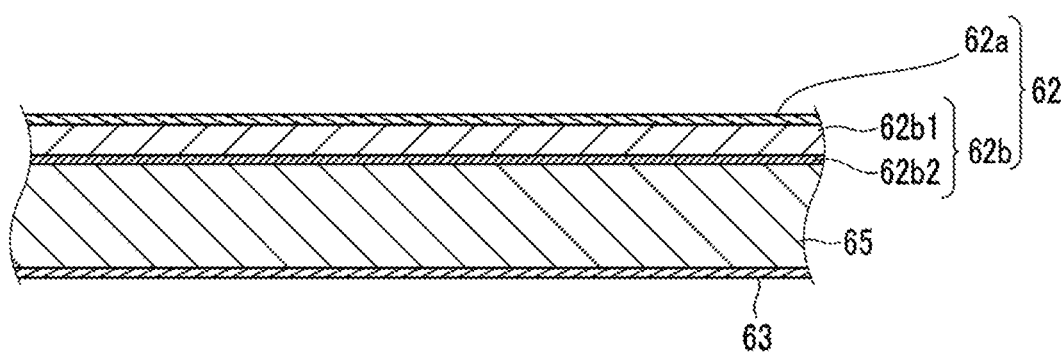
FIG. 6 is a cross-sectional view of a disk of the wheel of FIG. 4.

As shown in FIG. 6, the cushion member 62b includes a cushion part 62b1 and a shape retaining part 62b2 in order from one side (the upper side in FIG. 4) in the axial direction of the rim 60. The cushion part 62b1 is disposed adjacent to the skin 62a. The shape retaining part 62b2 is disposed adjacent to the cushion part 62b1.

The skin 62a and the shape retaining part 62b2 are disk-shaped members of 0.1 mm order (roughly from 0.1~0.9 mm) and are formed of a fiber-reinforced material. The cushion part 62b1 is a disk-shaped member made of one plate material of 1 mm order (roughly from 1~9 mm) and is formed of a shock absorbing material such as a hard foam material, a synthetic resin, wood, or the like.

Nevertheless, the skin member and the cushion member of the disclosure are not necessarily disk-shaped. For example, in the case where the peripheral portion and the central portion of the disk are configured differently, only the peripheral portion which is the portion susceptible to shock (for example, the portion to which the hand rim is attached) may be constituted by the skin member and the cushion member of the disclosure. In that case, the shapes of the skin member and the cushion member are annular. Further, the skin member and the cushion member do not necessarily have the same shape. For example, the cushion member may be disk-shaped and the skin member may be annular.

The fiber-reinforced material constituting the skin 62a and the shape retaining part 62b2 includes, for example, fiber-reinforced plastic using polyacrylonitrile (PAN)-based carbon fiber, aramid fiber-reinforced plastic, glass fiber, pitch-based carbon fiber, PBO fiber, polyarylate fiber, polyethylene fiber, or the like.

Regarding the disk 62 configured as described above, when shock is applied to the skin 62a of the disk 62, the shock is received by the cushion part 62b1 adjacent to the skin 62a. At this time, if the cushion part 62b1 is bent largely by the shock, the skin 62a is also bent together with the cushion part 62b1, and the skin 62a may be damaged. For example, the skin 62a may have cracks. However, in the case of the wheel 6a, the bend of the cushion part 62b1 is suppressed by the shape retaining part 62b2 disposed on the side of the cushion part 62b1 opposite to the skin 62a.

According to the wheel 6a, when shock is applied to the skin 62a of the disk 62, the influence of the shock is alleviated by the cushion member 62b. Therefore, the skin 62a (eventually, the disk 62 itself) is less likely to be damaged.

In addition, if it is only to prevent the disk 62 from being damaged, it may be considered to simply make the skin 62a thicker. However, generally fiber-reinforced material is heavy and light fiber-reinforced material is expensive. Thus, such a configuration may lead to an increase in the weight of the wheel 6a or a substantial increase in the manufacturing cost.

In contrast thereto, in the wheel 6a, the cushion member 62b is constituted by the cushion part 62b1 made of a shock absorbing member lighter than fiber-reinforced material, and the shape retaining part 62b2 having the same configuration as the skin 62a. The cushion member 62b and the skin 62a form the structure for absorbing the shock.

In comparison with a structure that simply makes the fiber-reinforced material thicker, the structure of the disclosure configured as above reduces the thickness of the fiber-reinforced material that is required for resistance against shock and therefore can prevent damaging the disk 62 as well as suppress an increase in weight and an increase in cost.

Although the illustrated embodiment has been described above, the disclosure is not limited to this embodiment.

For example, in the above embodiment, the wheel 6a according to the disclosure is applied to the rear wheel 6 which is the drive wheel of the wheelchair W. However, the wheel of the disclosure is not only applicable to the drive wheel of the wheelchair but also applicable to the wheels of other vehicles such as bicycle.

Moreover, in the above embodiment, the disk of the disclosure is applied to the disk 62 of the rear wheel 6, which is located on the side opposite to the cage 1. The reason is that the disk of the disclosure is particularly effective in preventing damage caused by shock of striking, and if it is disposed on the side opposite to the cage side where the hand of the occupant of the wheelchair is very likely to collide, the effect can be used effectively.

Nevertheless, the wheel of the disclosure is not limited to such a configuration. For example, when applied to the wheelchair, the disk of the wheel may be disposed on the cage side (that is, the side where the attaching part for attaching the hand rim is not disposed).

Further, in the above embodiment, the plate-shaped member 65 formed by using a plurality of plate-shaped parts 65a is disposed on the inner side of the rim 60. In addition, one plate material is used as the cushion part 62b1 that constitutes the disk 62. The reason is that the plate-shaped member 65 not only improves the strength against shock of striking (that is, shock in the radial direction and the circumferential direction) for the disk 62 but also increases the rigidity in the radial direction of the wheel 6a.

However, the wheel of the disclosure is not limited to such a configuration and may have any configuration as long as it constitutes a structure for absorbing shock on the disk. For example, the plate-shaped member may be formed of one plate material to make it easier for the plate-shaped member to absorb shock. Also, the plate-shaped member may be omitted if the disk alone can sufficiently absorb shock. Further, a member formed combining a plurality of members and beams may be used as the cushion member that constitutes the disk to increase the rigidity in the radial direction.

What is claimed is:
1. A wheel, comprising:
an annular rim onto which a tire is fitted; and
a disk covering the rim on one side in an axial direction of the rim,
wherein the disk comprises a skin member and a cushion member in order from the one side in the axial direction, wherein the skin member is formed of a first fiber-reinforced material and forms a skin of the disk, and the cushion member is disposed adjacent to the skin member, and
the cushion member comprises a cushion part and a shape retaining part in order from the one side in the axial direction, wherein the cushion part is formed of a first shock absorbing material and is disposed adjacent to the skin member, and the shape retaining part is formed of a second fiber-reinforced material and is disposed adjacent to the cushion part.

2. The wheel according to claim 1, comprising a plate-shaped member which is disposed on an other side in the axial direction with respect to the disk and on an inner side of the rim and is formed of a second shock absorbing material.

3. The wheel according to claim 2, wherein the plate-shaped member comprises a plurality of plate-shaped parts and a connection part, wherein the plate-shaped parts are formed of the second shock absorbing material, and the connection part is formed of a third fiber-reinforced material and connects the plate-shaped parts, and the cushion part of the cushion member is formed of one plate-shaped shock absorbing member.

4. The wheel according to claim 1, wherein the disk comprises an attaching part to which a hand rim of a wheelchair is attached on the one side in the axial direction.

5. The wheel according to claim 2, wherein the disk comprises an attaching part to which a hand rim of a wheelchair is attached on the one side in the axial direction.

6. The wheel according to claim 3, wherein the disk comprises an attaching part to which a hand rim of a wheelchair is attached on the one side in the axial direction.

7. A drive wheel, comprising:
the wheel according claim 1; and
a tire fitted onto the wheel.

8. A drive wheel, comprising:
the wheel according claim 2; and
a tire fitted onto the wheel.

9. A drive wheel, comprising:
the wheel according claim 3; and
a tire fitted onto the wheel.

10. A drive wheel, comprising:
the wheel according claim 4; and
a tire fitted onto the wheel.

11. A drive wheel, comprising:
the wheel according claim 5; and
a tire fitted onto the wheel.

12. A drive wheel, comprising:
the wheel according claim 6; and
a tire fitted onto the wheel.

13. A wheelchair, comprising:
a drive wheel, comprising the wheel according to claim 1; and
a tire fitted onto the wheel.

14. A wheelchair, comprising:
a drive wheel, comprising the wheel according to claim 2; and
a tire fitted onto the wheel.

15. A wheelchair, comprising:
a drive wheel, comprising the wheel according to claim 3; and
a tire fitted onto the wheel.

16. A wheelchair, comprising:
a drive wheel, comprising the wheel according to claim 4; and
a tire fitted onto the wheel.

17. A wheelchair, comprising:
a drive wheel, comprising the wheel according to claim 5; and
a tire fitted onto the wheel.

18. A wheelchair, comprising:
a drive wheel, comprising the wheel according to claim 6; and
a tire fitted onto the wheel.

* * * * *